US012264504B2

(12) United States Patent
Bal

(10) Patent No.: US 12,264,504 B2
(45) Date of Patent: Apr. 1, 2025

(54) LOCKING MECHANISM

(71) Applicant: TUSAS—TURK HAVACILIK VE UZAY SANAYII ANONIM SIRKETI, Ankara (TR)

(72) Inventor: Mustafa Bal, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 124 days.

(21) Appl. No.: 18/201,508

(22) Filed: May 24, 2023

(65) Prior Publication Data

US 2023/0383574 A1 Nov. 30, 2023

(30) Foreign Application Priority Data

May 30, 2022 (TR) ................................ 2022/008763

(51) Int. Cl.
*E05B 63/00* (2006.01)

(52) U.S. Cl.
CPC ....... *E05B 63/0017* (2013.01); *E05Y 2201/22* (2013.01); *E05Y 2800/296* (2013.01); *E05Y 2900/531* (2013.01)

(58) Field of Classification Search
CPC ............. E05B 63/0017; E05B 63/0021; E05Y 2201/22; E05Y 2800/296; E05Y 2900/531; E05Y 2900/532
USPC ............................................................ 70/129
See application file for complete search history.

(56) References Cited

U.S. PATENT DOCUMENTS

| | | | | |
|---|---|---|---|---|
| 225,380 A * | 3/1880 | Hooper | E05B 63/0017 | 292/DIG. 15 |
| 758,333 A * | 4/1904 | Pfleghar | E05B 63/0017 | 292/147 |
| 2,357,305 A * | 9/1944 | Barrett | E05B 37/10 | 70/284 |
| 4,637,237 A * | 1/1987 | Witkoski | E05B 37/16 | 70/156 |
| 8,448,997 B2 * | 5/2013 | Laliberte | E05B 63/0069 | 49/394 |
| 2003/0037578 A1 * | 2/2003 | LaConte | B64D 45/0028 | 70/134 |

(Continued)

FOREIGN PATENT DOCUMENTS

| | | | |
|---|---|---|---|
| CA | 2625366 A1 * | 9/2008 | E05B 13/002 |
| EP | 3458660 B1 * | 7/2020 | E05B 47/0038 |

(Continued)

*Primary Examiner* — Nathan Cumar
(74) *Attorney, Agent, or Firm* — NOTARO, MICHALOS & ZACCARIA P.C.

(57) ABSTRACT

A locking mechanism for a door has a lever that is mounted on the door that can be rotated on the door to enable the door to be opened or closed. A first disc, located on the door, is triggered by moving the lever. A shaft is located on the door in contact with the first disc and moves along an extension direction when the first disc is triggered. A slot is located on the body in the direction that the shaft extends, and into which the shaft is inserted in a removable way. The locking mechanism has an open position (I) in which the shaft is located far from the slot and the door can be opened by the user and a lock position (II) that limits the movement of the door, in which the shaft is almost completely contained in the slot.

14 Claims, 3 Drawing Sheets

(56) References Cited

U.S. PATENT DOCUMENTS

| | | | | |
|---|---|---|---|---|
| 2011/0173891 | A1* | 7/2011 | Laliberte | E05F 15/632<br>70/95 |
| 2015/0376921 | A1* | 12/2015 | Corwin, Jr. | E05B 47/02<br>292/195 |
| 2017/0247913 | A1* | 8/2017 | Horeth | E05B 49/00 |
| 2020/0239119 | A1* | 7/2020 | Andreani | B64C 1/1423 |
| 2023/0383574 | A1* | 11/2023 | Bal | E05C 1/06 |

FOREIGN PATENT DOCUMENTS

| | | | | | |
|---|---|---|---|---|---|
| GB | 393180 | A | | 6/1933 | |
| GB | 2115054 | A | * | 9/1983 | E05B 37/12 |
| JP | H11350814 | A | | 12/1999 | |

* cited by examiner

LOCKING MECHANISM

FIELD

The present invention relates to a locking mechanism developed to keep the sliding doors in a lock position.

BACKGROUND

The use of locking mechanisms on doors, which is one of the lightweight equipment used in aviation, is important. In case of external or internal locking system requests in air vehicle sliding door systems, the mechanism that will lock the system first moves in the direction of the door movement axis and then in the direction perpendicular to the door movement axis, completing the locking process. In similar locking systems, hook-type locking systems are preferred in common. However, the reliability of such systems (the ability of the system to cling to its slot) is uncertain, with the possibility of causing injury to the user. Therefore, there is a need to provide a lightweight and effective locking system suitable for aviation structures.

JPH11350814, which is covered by the known-state of the art, discloses a locking mechanism for vehicle doors. Said mechanism comprises a locking device for simplifying the connection of a rotary lever and a key lever. Said device has a base plate with one horizontal wall and one vertical wall; a body that is fixed to the horizontal wall; a rotary lever that is located on the vertical wall; and a key lever that is located on a housing of an actuator so as to turn freely.

US2011173891, which is covered by the known-state of the art, discloses an apparatus and a system comprising a release assembly configured to unlock a sliding door panel from left and right sides of the sliding door panel. The left and right sides of the sliding door panel are opposed in the sliding direction.

GB393180, which is covered by the known-state of the art, discloses a locking mechanism for sliding doors. Said mechanism has a handle in the form of a lever with a horizontal pivot. When the handle is pulled to open the door, an end of the lever bears on an lever of a bell-cranked latch which is thus rocked on its vertical pivot and withdrawn. The face of the latch is shaped concentric with the pivot. The mechanism also has a plate with a recess configured only to receive the latch.

US2020239119, which is covered by the known-state of the art, discloses a door arrangement for air vehicles. Said door arrangement comprises a passenger door, a fuselage portion accommodating the passenger door, and a girt bar for arming and disarming an emergency slide. The passenger door is movable relative to the fuselage portion between a raised position and a lowered position. The girt bar is connectable by means of a connecting arrangement to the passenger door and/or to the fuselage portion. The connecting arrangement comprises a mechanism which is configured to, during arming of the emergency slide, actuate a locking mechanism of an engagement device fastened to the fuselage portion. Therefore, the girt bar is fixed in a decouplable manner to the engagement device.

Thanks to a locking mechanism according to the invention, a high-strength door locking system is provided.

SUMMARY

Another object of the present invention is to provide a lightweight door locking system for air vehicles.

A further object of the present invention is to provide a practical, effective, and easy way to lock the doors.

A locking mechanism realized to achieve the object of the invention, which is defined in the first claim and other claims dependent thereon, comprises a body which is an air and/or space vehicle; at least one door on the body, which is opened or closed to allow access into the body; at least one lever attached removably on the door, which is rotated by the user to provide movement of the door; a first disc which is located on the door in a rotatable manner around an axis where it is attached to the door, and which is triggered and moved by the lever actuated by the user; a shaft located on the door in contact with the first disc, which can move in the direction it extends when triggered by the first disc; a slot which is located on an axis that the shaft extends, and in which the shaft is removably inserted; an open position (I) in which the shaft is not located in the slot, such that the user can open the door; a lock position (II) in which the door cannot be opened, the shaft is almost completely inserted into the slot, and the movement of the door is blocked.

The locking mechanism according to the invention comprises a second disc located on the body, actuated by the lever, and capable of moving simultaneously with the first disc; a holder actuated by the second disc to move in the direction it extends; at least one pin located in the holder, which is inserted into the slot so as to bring the door to the lock position (II), and which is placed inside the slot when the shaft is actuated and prevents the movement of the door; the second disc with an eccentric shape, which is actuated by the shaft and inserted into the slot while switching from the open position (I) to the lock position (II), and which triggers the holder in order to prevent the movement of the door by contacting the inner walls of the slot when the pin is removed from the holder and inserted into the slot.

In an embodiment of the invention, the locking mechanism comprises the pin actuated by the shaft when moving from the open position (I) to the lock position (II) and almost protruding from the holder; and the holder that the second disc pulls back in the direction it extends; the pin which abuts almost completely in contact with the slot wall by means of the holder, thereby allowing the door to remain in the lock position (II).

In an embodiment of the invention, the locking mechanism comprises a first wall surrounding the first disc, which allows the shaft to be moved in the direction that the shaft is triggered, by the rotation of the first disc, and enables the shaft to be clamped to the outer surface of the first disc by sliding through the channel therein; a second wall surrounding the second disc, which allows the holder to be moved in the direction that the holder is triggered, by the rotation of the second disc, and enables the holder to be clamped to the outer surface of the second disc by sliding through the channel therein.

In an embodiment of the invention, the locking mechanism comprises a channel which prevents the pin from disengaging from the shaft when actuated by the shaft, enables the pin to be clamped to the shaft in a movable manner, wherein the pin can extend out of the holder by means of the channel through the path on the shaft.

In an embodiment of the invention, the locking mechanism comprises at least one hole located on the holder on an axis almost completely parallel to the direction that the pin extends, such that the pin can move along the axis it extends.

In an embodiment of the invention, the locking mechanism comprises the pin located on the door when in the open position (I), and located in the slot at least partially in contact with the walls of the slot when in the lock position (II).

In an embodiment of the invention, the locking mechanism comprises a first piece and a second piece which form the pin and move towards the slot in a direction perpendicular to the movement direction of the pin upon triggering of the pin by the shaft when the door is moved from the lock position (II) to the open position, such that the first piece and the second piece are positioned oppositely in the holder; the second disc comprising multiple and different arc-shaped surfaces so as to allow the holder to move immediately after the shaft to change the movement direction of the holder when it is brought from the lock position (II) to the open position (I).

In an embodiment of the invention, the locking mechanism comprises the second disc which is positioned on the first disc with at least one side thereof facing the first disc, thereby enabling the shaft to be inserted into the slot and moved simultaneously with the holder.

In an embodiment of the invention, the locking mechanism comprises the first piece and the second piece, at least one side of which is form-compatible with the shaft, in order to form a continuous surface when they contact the shaft and to fully grasp the shaft.

In an embodiment of the invention, the locking mechanism comprises an extension located almost completely on the door when the shaft is in the lock position (II); a protrusion extending from the extension towards the shaft, which is positioned to restrict the movement of the extension with the shaft; at least one tab extending from the shaft to the extension and providing a connection for the shaft and extension to contact each other.

In an embodiment of the invention, the locking mechanism comprises at least one fastener which connects the first disc and the second disc and is located on the door far from the slot, at a distance that is almost equal to the distance that the holder is inserted into the slot and the distance to the center point of the first disc.

In an embodiment of the invention, the locking mechanism comprises the lever located coaxially with the fastener, enabling the simultaneous movement of the first disc and the second disc.

In an embodiment of the invention, the locking mechanism comprises the door with a sliding mechanism.

In an embodiment of the invention, the locking mechanism comprises at least one groove on the first disc, which allows easier movement of the first disc in the door and makes the first disc lighter.

BRIEF DESCRIPTION OF THE DRAWINGS

The locking mechanism realized to achieve the object of the present invention is illustrated in the attached drawings, in which.

DETAILED DESCRIPTION

Figure 1:
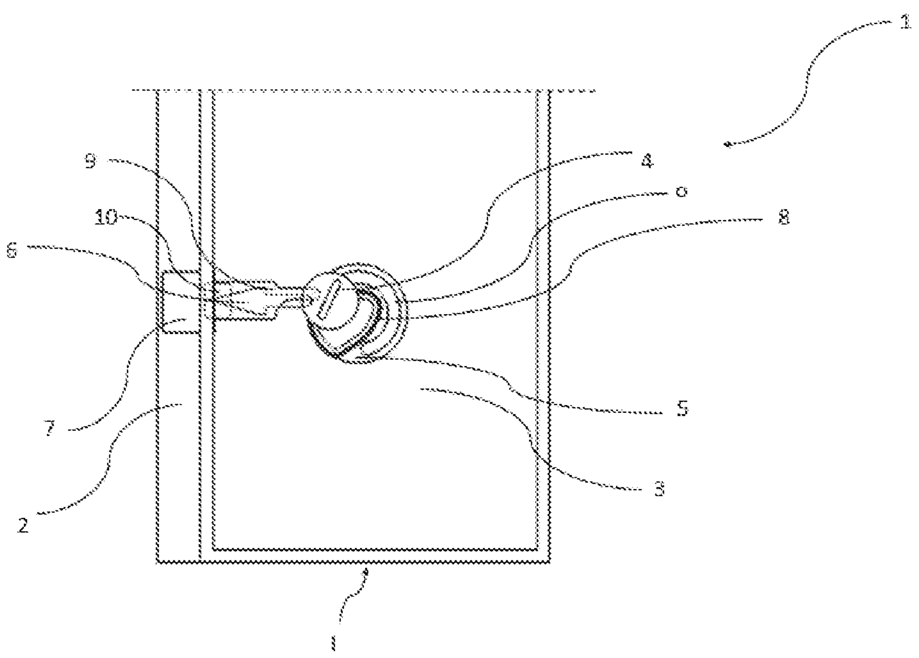
FIG. 1 is a cross-sectional view of a locking mechanism in the open position (I).

All the parts illustrated in figures are individually assigned a reference numeral and the corresponding terms of these numbers are listed below:

1. Locking Mechanism
2. Body
3. Door
4. Lever
5. First Disc
501. First Wall
6. Shaft
7. Slot
8. Second Disc
801. Second Wall
9. Holder
10. Pin
1001. First Piece
1002. Second Piece
b. Fastener
c. Protrusion
d. Hole
k. Channel
o. Groove
t. Tab
u. Extension
I. Open Position
II. Lock Position The locking mechanism (1) comprises a body (2); at least one door (3) on the body (2), which can be opened or closed to provide access into the body (2); at least one lever (4) mounted on the door (3), which is rotated on the door (3) to enable the door (3) to be opened or closed; a first disc (5) located on the door (3) rotatably around the center where it is attached to the door (3), and triggered by the user moving the lever (4); a shaft (6) located on the door (3) in contact with the first disc (5) and moving along the direction it extends when the first disc (5) is triggered; a slot (7) located on the body (2) in the direction that the shaft (6) extends, and into which the shaft (6) is inserted in a removable way; an open position (I) in which the shaft (6) is located far from the slot (7) and the door (3) can be opened by the user; a lock position (II) that limits the movement of the door (3), in which the shaft (6) is almost completely contained in the slot (7).

The locking mechanism (1) according to the invention comprises a second disc (8) located on the body (2), triggered by the lever (4), and moving simultaneously with the first disc (5); a holder (9) which is triggered by the second disc (8) and thus moves in the direction it extends; at least one pin (10) located in the holder (9), which is inserted in the slot (7) so as to allow the door (3) to be brought to the lock position (II), and which is triggered by the movement of the shaft (6) so as to be inserted in the slot (7); the pin (10) inserted in the slot (7) in contact with the wall of the slot (7) when switching from the open position (I) to the lock position (II); the second disc (8) in eccentric form, which triggers the holder (9) with its rotation around itself, thus allowing the holder (9) to move in the direction in which it extends, thus allowing the pin (10) to be inserted into the slot (7).

The locking mechanism comprises at least one door (3) on a body (2) consisting of air vehicles, which can be opened or closed and provides access to the interior of the air vehicle and/or the inside of the body (2). In order to open or close the door (3), at least one lever (4) is provided on the door (3), which rotates around the center where it is connected to the door (3). There is provided at least a first disc (5), preferably in eccentric form, located in the door (3), which can move by means of the lever (4) and rotate around the center to which it is connected, and at least one shaft (6) triggered by the first disc (5) at full length. Inside the body (2), there is at least one slot (7) which is located opposite the shaft (6) in the movement direction of the shaft (6), and into which the shaft (6) is removably inserted in the body (2). There is an open position (I) in which the shaft (6) is located outside the slot (7) and the door (3) can be moved easily by the user. There is a lock position (II) in which the shaft (6) is almost completely inserted into the slot (7), preventing the door (3) from moving. In this way, it is ensured that the door (3) is moved between the lock position (II) and the open position (I). (FIG. 1)

Figure 2:
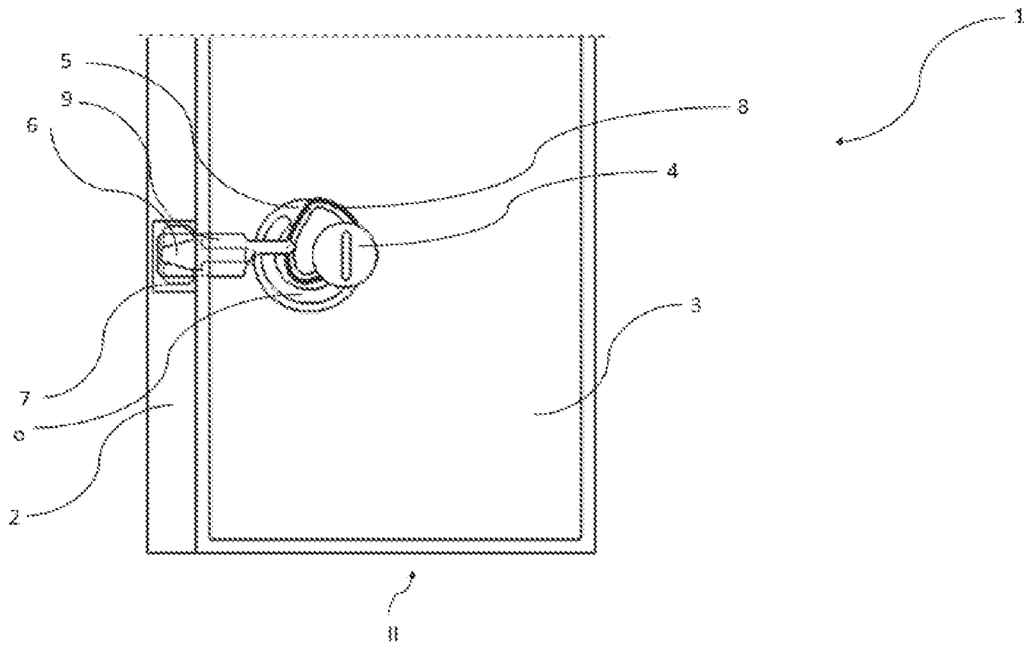
FIG. 2 is a cross-sectional view of a locking mechanism in the lock position (II).

It comprises the body (2); a second disc (8) which is located in the body (2) consisting of the air vehicle, and which can move simultaneously with the first disc (5) when triggered by the lever (4); and a holder (9) triggered by the second disc (8) to move linearly. There is at least one pin (10) inside the holder (9), which is triggered by the shaft (6) to move, and allows the door (3) to remain in the lock position (II) when it is inserted into the slot (7). The pin (10) is triggered by the shaft (6) to protrude from the holder (9) triggered by the second disc (8) having an eccentric form, in contact with the wall of the slot (7), thereby preventing the movement of the door (3). Therefore, an effective and solid lock position is obtained (FIG. 2).

In an embodiment of the invention, the locking mechanism (1) comprises the pin (10) which is triggered by the shaft (6) when switching from the open position (I) to the lock position (II), such that the pin (10) at least partially protrudes from the holder (9); and the holder (9), which is pulled back by the second disc (8) in the direction it extends; the pin (10) which abuts against the wall of the slot (7) by means of the holder (9), thus ensuring that the door (3) is kept in the lock position (II). When the pin (10) is moved from the open position (I) to the lock position (II), it provides locking by extending outward from the holder (9) thanks to the trigger of the shaft (6). While the door (3) is brought from the open position (I) to the lock position (II), the second disc (8) triggers the holder (9) and moves it back in the direction it extends. The pin (10) is brought into the slot (7) using the holder (9), such that it rests on the wall of the slot (7). In this way, the door (3) can be kept in the lock position (II) (FIG. 1).

Figure 3:
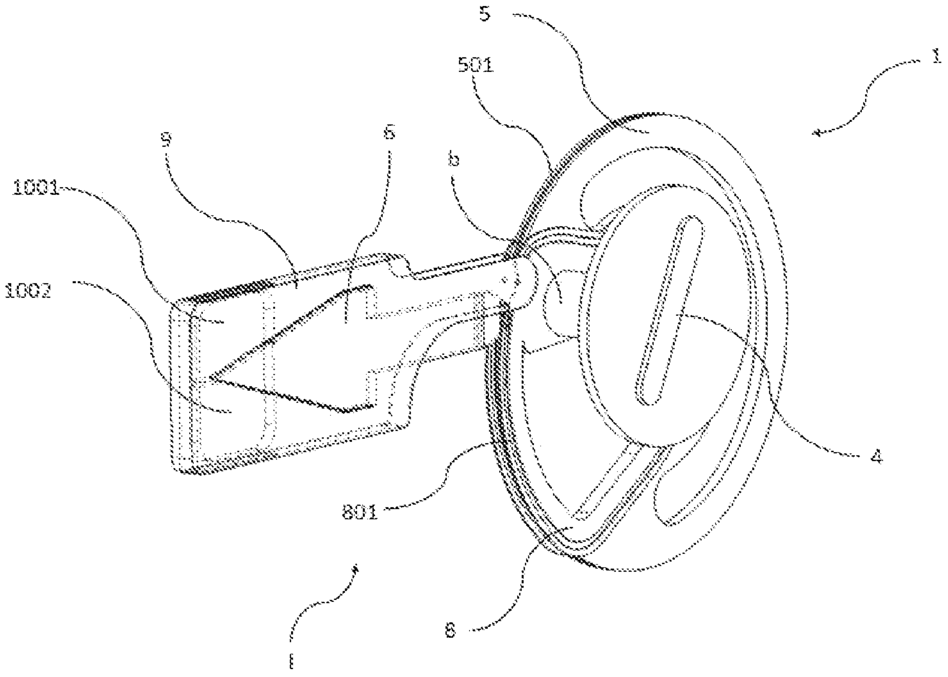
FIG. 3 is a perspective view of a locking mechanism in the open position (I).

In an embodiment of the invention, the locking mechanism (1) comprises a first wall (501) surrounding the first disc (5), which allows the shaft (6) to be triggered and moved in the direction that the shaft (6) extends during rotation of the first disc (5), and enables the shaft (6) to be clamped on the first disc (5) such that the shaft (6) can slide through the channel (k) therein; a second wall (801) surrounding the second disc (8), which enables the second disc (8) to transfer its movement to the holder (9) while rotating, and enables the holder (9) to be clamped on the second disc (8) such that the holder (9) can slide through the channel (k) therein. It comprises a first wall (501) which creates a path on the first disc (5) and enables the shaft (6) to be movably clamped on the first disc (5) during the rotational movement of the first disc (5). In this way, the shaft (6) can be clamped such that it can move on the first disc (5) while moving. It comprises a second wall (801) which creates a path on the second disc (8) and enables the holder (9) to be movably clamped on the second disc (8) during the rotational movement of the second disc (8). In this way, the holder (9) can be clamped such that it can move on the second disc (8) while moving (FIG. 3).

In an embodiment of the invention, the locking mechanism (1) comprises a channel (k) which prevents the pin (10) from disengaging from the shaft (6) when actuated by the shaft (6), enables the pin (10) to be clamped to the shaft (6) in a movable manner, wherein the pin (10) can move on the shaft (6) out of the holder (9) through the channel (k). It comprises the channel (k) which prevents the pin (10) actuating the shaft (6) from disengaging from the shaft (6), so that the pin (10) can move out of the holder (9) by moving through the slot on the shaft (6) (FIG. 3).

Figure 4:
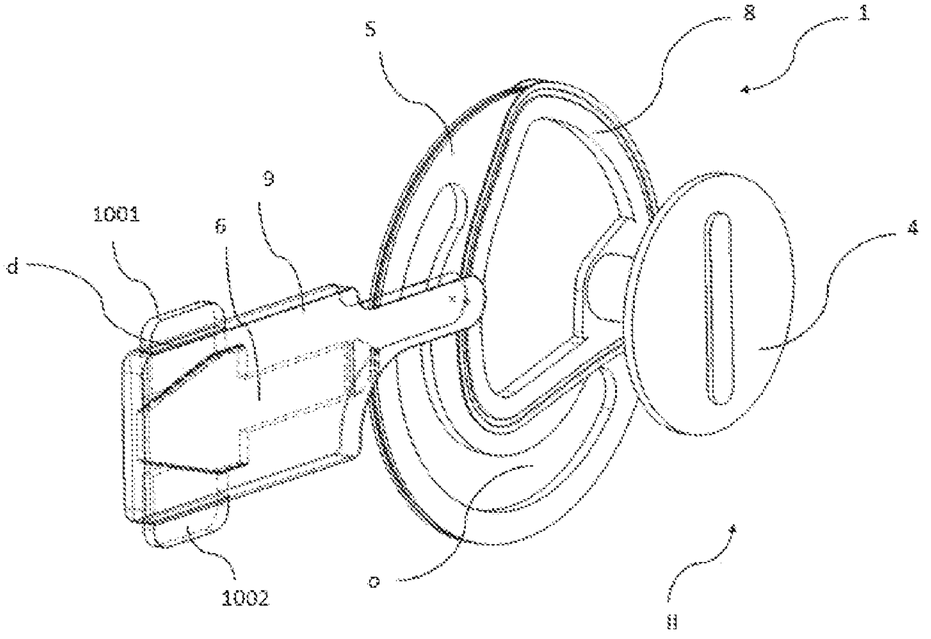
FIG. 4 is a perspective view of a locking mechanism in the open position (I).

In an embodiment of the invention, the locking mechanism (1) comprises at least one hole (d) located on the holder (9) almost parallel to the direction in which the pin (10) extends, for actuating the pin (10) along the direction in which it extends. There is at least one hole (d) on the holder (9) that allows the pin (10) triggered by the shaft (6) to extend out of the holder (9). Therefore, the pin (10) extends out of the holder (9) in a direction perpendicular to the movement of the holder (9) and settles on the wall of the slot (7), thus performing the locking process (FIG. 4).

In an embodiment of the invention, the locking mechanism (1) comprises the pin (10) located almost completely on the door (3) when in the open position (I), and located in the slot (7) at least partially facing and in contact with the wall of the slot (7) when in the lock position (II). Therefore, while the pin (10) does not prevent the door (3) from opening when in the open position (I), it prevents the door (3) from opening in the lock position (II) since it is inserted into the slot (7).

In an embodiment of the invention, the locking mechanism (1) comprises a first piece (1001) and a second piece (1002) in the holder (9), which move into the slot (7) almost perpendicular to the movement direction of the pin (10) upon triggering of the pin (10) by the shaft (6) when the door (3) is moved from the lock position (II) to the open position, such that the first piece (1001) and the second piece (1001) are positioned oppositely; the second disc (8) comprising multiple and different arc-shaped surfaces so as to allow the holder (9) to move after the shaft (6) to change the movement direction of the holder (9) when it is brought from the lock position (II) to the open position (I). The pin (10) consists of a first piece (1001) and a second piece (1002) located oppositely, which move in opposite directions out of the holder (9) so as to settle on the wall of the slot (7). In this way, it is fully inserted into the slot (7) in the lock position (II) and enables the door (3) to be locked. In order to move the holder (9) later than the shaft (6) while the door (3) is brought from the lock position (II) to the open position (I), the second disc (8) has multiple different arc-shaped eccentric forms compared to the first disc (5), which is in the form of a full disc. Accordingly, the shaft (6) moves before the holder (9) and stops triggering the first piece (1001) and the second piece (1002), allowing time for the first piece (1001) and the second piece (1002) to settle into the holder (9), and prevents the locking system from jamming, allowing a more effective locking process (FIG. 4).

In an embodiment of the invention, the locking mechanism (1) comprises the second disc (8) which is positioned on the first disc (5) with at least one side thereof facing the first disc (5), thereby enabling the shaft (6) to be inserted into the slot (7) and moved simultaneously with the holder (9). Therefore, the simultaneous movement of the shaft (6) with the holder (9) is provided when/after the pin (10) is triggered, so that the system is prevented from jamming and a more efficient operation is ensured.

In an embodiment of the invention, the locking mechanism (1) comprises the first piece (1001) and the second piece (1002), at least one side of which is form-compatible with the shaft (6) so as to almost completely grasp the shaft (6), in order to provide a continuous surface for the contact with the shaft (6). In this way, the system is prevented from jamming, and an effective locking process is provided.

Figure 5:
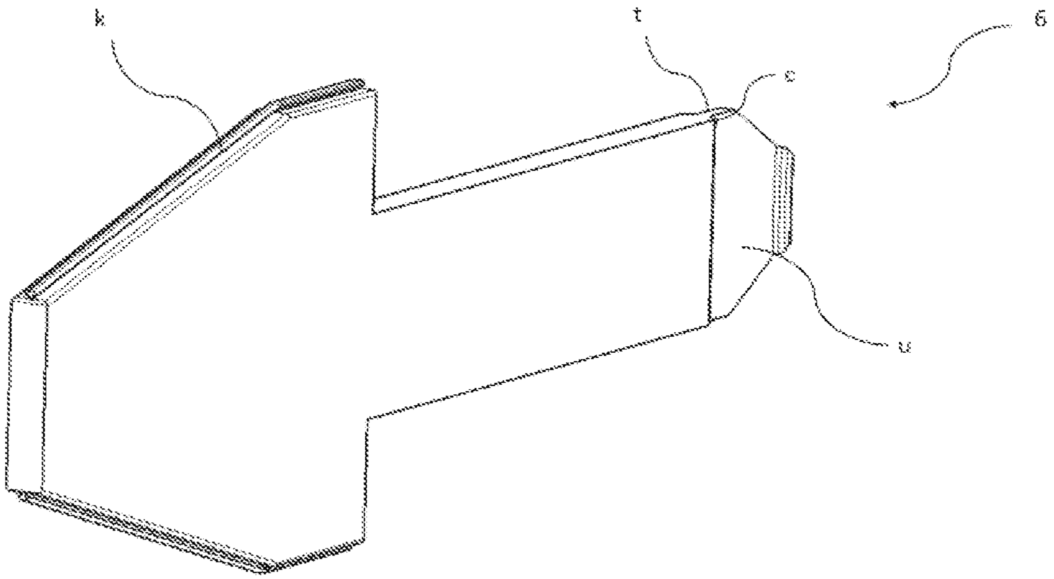
FIG. 5 is a perspective view of a shaft.

In an embodiment of the invention, the locking mechanism (1) comprises an extension (u) located almost completely on the door (3) when the shaft (6) is in the lock position (II); a protrusion (c) extending from the extension (u) towards the shaft (6), and positioned to restrict the movement of the extension (u) with the shaft (6); at least one tab (t) extending from the shaft (6) to the extension (u) and enabling the shaft (6) and extension (u) to be connected in contact with each other. Thus, the movement of the shaft (6) is facilitated/simplified while it is actuated between the lock position (II) and the open position (I) (FIG. 5).

In an embodiment of the invention, the locking mechanism (1) comprises at least one fastener (b) which connects the first disc (5) and the second disc (8) and which is located on the door (3) far from the slot (7) such that, in the lock position (II), the distance of the fastener (b) to the holder (9) in the slot (7) is almost equal to the distance of the fastener (b) to the center of the first disc (5). The fastener (b)—which connects the first disc (5) and the second disc (8) so as to provide a simultaneous movement thereof, and on which the lever (4) is placed—is located in an opposite direction with respect to the location of the slot (7) from the center point of the first disc (5), as far as the maximum distance that the shaft (6) can reach in the slot (7). Therefore, the system is prevented from jamming, and the movement of the holder (9) and the shaft (6) can be adjusted easily.

In an embodiment of the invention, the locking mechanism (1) comprises the lever (4) which provides the simultaneous movement of the first disc (5) with the second disc (8), and which is positioned coaxially with the fastener (b). In this way, the door (3) can be brought to the open position (I) or lock position (II).

In an embodiment of the invention, the locking mechanism (1) comprises the door (3) with a sliding mechanism.

In an embodiment of the invention, the locking mechanism (1) comprises at least one groove (o) on the first disc (5), which allows easier movement of the first disc (5) in the door (3) and makes the first disc (5) lighter.

What is claimed is:

1. A locking mechanism (1) for securing a door (3) to a body (2), the door (3) coupled to the body (2) and configured be opened or closed to provide access into the body (2), comprising:

- at least one lever (4) mounted on the door (3), which is rotated on the door (3) to enable the door (3) to be opened or closed;
- a first disc (5) located on the door (3) rotatably around the center of the first disc (5) where the first disc (5) is attached to the door (3), and triggered by a user moving the lever (4);
- a shaft (6) located on the door (3) in contact with the first disc (5) and moving along the direction in which the shaft (6) extends when the first disc (5) is triggered;
- a slot (7) located on the body (2) in the direction that the shaft (6) extends, and into which the shaft (6) is inserted in a removable way, wherein the locking mechanism has an open position (I) in which the shaft (6) is located far from the slot (7) and the door (3) can be opened by the user, and a lock position (II) that limits the movement of the door (3) in which the shaft (6) is almost completely contained in the slot (7);
- a second disc (8) located on the body (2), triggered by the lever (4), and moving simultaneously with the first disc (5);
- a holder (9) which is triggered by the second disc (8) and thus moves in the direction the holder (9) extends;
- at least one pin (10) located in the holder (9), which is inserted in the slot (7) so as to allow the door (3) to be brought to the lock position (II), and which is triggered by the movement of the shaft (6) so as to be inserted in the slot (7);
- wherein the pin (10) is inserted in the slot (7) in contact with the wall of the slot (7) when switching from the open position (I) to the lock position (II);
- wherein the second disc (8) has an eccentric form, which triggers the holder (9) with rotation around itself, thus allowing the holder (9) to move in the direction in which the holder (9) extends, thus allowing the pin (10) to be inserted into the slot (7).

2. A locking mechanism (1) according to claim 1, wherein the pin (10) is triggered by the shaft (6) when switching from the open position (I) to the lock position (II), such that the pin (10) at least partially protrudes from the holder (9); the holder (9), which is pulled back by the second disc (8) in the direction the holder (9) extends; the pin (10) which abuts against the wall of the slot (7) by means of the holder (9), thus ensuring that the door (3) is kept in the lock position (II).

3. A locking mechanism (1) according to claim 1, comprising a first wall (501) surrounding the first disc (5), which allows the shaft (6) to be triggered and moved in the direction that the shaft (6) extends during rotation of the first disc (5), and enables the shaft (6) to be clamped movably on the first disc (5) such that the shaft (6) can slide through the path therein; a second wall (801) surrounding the second disc (8), which enables the second disc (8) to transfer movement thereof to the holder (9) while rotating, and enables the holder (9) to be clamped movably on the second disc (8) such that the holder (9) can slide through the path therein.

4. A locking mechanism (1) according to claim 1, comprising a channel (k) which prevents the pin (10) from disengaging from the shaft (6) when actuated by the shaft (6), enables the pin (10) to be clamped to the shaft (6) in a movable manner, wherein the pin (10) can move on the shaft (6) out of the holder (9) through the channel (k) by means of a slit therein.

5. A locking mechanism (1) according to claim 1, comprising at least one hole (d) located on the holder (9) almost parallel to the direction in which the pin (10) extends, for actuating the pin (10) along the direction in which the pin (10) extends.

6. A locking mechanism (1) according to claim 1, wherein the pin (10) is located almost completely on the door (3) when in the open position (I), and located in the slot (7) at least partially facing and in contact with the wall of the slot (7) when in the lock position (II).

7. A locking mechanism (1) according to claim 1, comprising a first piece (1001) and a second piece (1002) in the holder (9) which each move into the slot (7) almost perpendicular to the movement direction of the pin (10) upon triggering of the pin (10) by the shaft (6) when the door (3) is moved from the lock position (II) to the open position, such that the first piece (1001) and the second piece (1001) are positioned oppositely; the second disc (8) comprising multiple and different arc-shaped surfaces so as to allow the holder (9) to move after the shaft (6) to change the movement direction of the holder (9) when the holder (9) is brought from the lock position (II) to the open position (I).

8. A locking mechanism (1) according to claim 1, wherein the second disc (8) which is positioned on the first disc (5)

with at least one side thereof facing the first disc (5), thereby enabling the shaft (6) to be inserted into the slot (7) and moved simultaneously with the holder (9).

9. A locking mechanism (1) according to claim 7, wherein the first piece (1001) and the second piece (1002) each have at least one side thereof which is form-compatible with the shaft (6) so as to almost completely grasp the shaft (6) in order to provide a continuous surface for contact with the shaft (6).

10. A locking mechanism (1) according to claim 1, comprising:

an extension (u) located almost completely on the door (3) when the shaft (6) is in the lock position (II);

a protrusion (c) extending from the extension (u) towards the shaft (6), and positioned to restrict the movement of the extension (u) with the shaft (6); and at least one tab (t) extending from the shaft (6) to the extension (u) and enabling the shaft (6) and extension (u) to be connected in contact with each other.

11. A locking mechanism (1) according to claim 1, comprising at least one fastener (b) which connects the first disc (5) and the second disc (8) and which is located on the door (3) far from the slot (7) such that, in the lock position (II), a distance of the fastener (b) to the holder (9) in the slot (7) is almost equal to a distance of the fastener (b) to the center of the first disc (5).

12. A locking mechanism (1) according to claim 11, wherein the lever (4) provides simultaneous movement of the first disc (5) with the second disc (8) and is positioned coaxially with the fastener (b).

13. A locking mechanism (1) according to claim 1, wherein the door (3) has a sliding mechanism.

14. A locking mechanism (1) according to claim 1, comprising at least one groove (o) on the first disc (5), which makes the first disc (5) lighter.

* * * * *